United States Patent [19]
Leibowitz

[11] Patent Number: 4,660,164
[45] Date of Patent: Apr. 21, 1987

[54] MULTIPLEXED DIGITAL CORRELATOR

[75] Inventor: Lawrence M. Leibowitz, Fairfax, Va.

[73] Assignee: The United States of America as represented by the Secretary of the Navy, Washington, D.C.

[21] Appl. No.: 558,070

[22] Filed: Dec. 5, 1983

[51] Int. Cl.[4] .......................................... G06F 15/336
[52] U.S. Cl. ..................................................... 364/728
[58] Field of Search ........................... 364/728; 375/96

[56] References Cited

U.S. PATENT DOCUMENTS

| | | | |
|---|---|---|---|
| 3,463,911 | 8/1969 | Dupraz et al. | 364/728 |
| 3,831,013 | 8/1974 | Alsup et al. | 364/728 |
| 3,959,641 | 5/1976 | Miller, Jr. et al. | 364/728 |
| 4,007,330 | 2/1977 | Winters | 375/96 |
| 4,030,038 | 6/1977 | Daniel et al. | 364/728 |
| 4,071,903 | 1/1978 | Head et al. | 364/728 |
| 4,132,989 | 1/1979 | Arens | 343/5 CM |
| 4,156,923 | 5/1979 | Lampe et al. | 364/844 |
| 4,254,417 | 3/1981 | Speiser | 364/728 |
| 4,264,983 | 4/1981 | Miller | 364/724 |
| 4,283,767 | 8/1981 | Roundtree | 364/574 |
| 4,314,348 | 2/1982 | Carr | 364/724 |
| 4,347,580 | 8/1982 | Bond | 364/728 |
| 4,392,232 | 7/1983 | Andren et al. | 364/728 |
| 4,484,299 | 11/1984 | Lambourn | 364/724 |
| 4,490,805 | 12/1984 | Tamura | 364/728 |
| 4,493,048 | 1/1985 | Kung et al. | 364/728 |
| 4,559,606 | 12/1985 | Jezo et al. | 364/728 |
| 4,559,607 | 12/1985 | Lu | 364/728 |

OTHER PUBLICATIONS

Leibowitz "Comparative Analysis of the use of Dynamic and Static Shift Registers in Digital Signal Processors (U)", Naval Research Laboratory Report #7482, pp. 6-8, Dec. 26, 1972.
Colvin "Spread Spectrum Devices Cater to New Systems," Microwaves, vol. 20, #2, pp. 65-80, Feb. 1981.
TRW LSI Products Data Sheet 102B for TDC 1004J Correlator, El Segundo, Calif., Jan. 1980.
TRW LSI Products Data Sheet 116C for TDC 1023J Correlator, El Segundo, Calif., Sep. 1980.
Eldon, "Digital Correlators Suit Military Applications", EDN, pp. 148-160, Aug. 23, 1984.

Primary Examiner—James D. Thomas
Assistant Examiner—Dale M. Shaw
Attorney, Agent, or Firm—Sol Sheinbein; John L. Forrest

[57] ABSTRACT

A high speed multiplexed digital correlator device for correlating serial data against reference data. The device includes a plurality of digital correlators configured to operate in parallel with their operations overlapping in time. The serial data is divided between the plurality of correlators by multiplexing means. The outputs of the plurality of correlators are summed to produce an overall correlation output signal. Due to the multiplexed configuration, the individual correlators operate at a much lower rate than the data rate of the serial data to be correlated. Also disclosed are synchronized mutliplexed correlators including multiple multiplexed correlators for correlating serial data differing in phase relationship with the reference data against which it is to be correlated.

4 Claims, 5 Drawing Figures

MULTIPLEXED DIGITAL CORRELATOR

BACKGROUND OF THE INVENTION

The present Invention relates generally to signal processing and, more particularly, to novel digital correlation systems.

A digital correlator is a device capable of detecting the presence of a replica of a finite length reference binary code sequence in a relatively long signal sequence of bits. These devices have many applications such as in signal processing, spread spectrum communications, code synchronization/detection, and error correction coding.

An N-bit digital correlator operates to compare an incoming data stream to N bits of a reference word. Although the following discussion will be concerned with the comparison of serial bit streams it is to be understood that multiple bit digital data can be processed in parallel. The correlator presents a measure of the amount of correlation between corresponding bits in the signal data stream and the reference word. One such measure is the number of bit agreements but others can also be used. Whenever N signal bits correspond exactly to the N-bit reference word, perfect correlation occurs and the correlator output will be a maximum. Often times it is useful for the correlator to signal not only the presence or lack of perfect correlation but also to quantify partial correlation. One such measure would be the number of agreements between the corresponding bits in the data stream and the reference word. Other measures can also be used.

A simplified logic diagram of a typical prior art digital correlator is shown in FIG. 1. In the digital correlator 10, a signal register 20 is a shift register containing N elements 22, 24, 26, and 28 for storage of binary bits. Binary data is fed into one end of the shift register chain of the signal register 20 on a serial input signal line 30. At each clock pulse appearing on the signal clock line 32, the binary bit on the serial input signal line 30 is written into the highest order storage element 22. Simultaneously data already existing in the storage elements 22, 24 and 26 are shifted to the next lower storage elements 24, 26 and 28, respectively. Data already in the lowest order element 28 is lost upon a shift. Thus after N cycles of the signal clock, the signal register 20 contains N bits of the data stream $(s_N, s_{N-1}, \ldots s_2, s_1)$. The signal clock is presumed to be synchronized with the data in the signal bit stream flowing on the serial input signal line 30. It is also presumed that the data stream is considerably longer than the N-bit capacity of the signal register 20, so that the signal register 20 contains the N latest bits in the data stream. At each signal clock cycle, the data in the signal register 20 is shifted by one storage element to reflect the recently arrived bit. Each storage element 22, 24, 26, and 28 has a respective output line 34, 36, 38 and 40 that carries a signal indicative of the most recent data bit in the respective storage element.

The digital correlator 10 of FIG. 1 further includes a reference register 50 which is a shift register similar to the signal register 20 and which also includes N storage elements 52, 54, 56, and 58. A reference clock signal appearing on a reference clock line 60 controls the reference word input to the reference register 50 during an initialization phase when an N-bit reference word $(r_n, r_{n-1}, \ldots r_2, r_1)$ is serially impressed on the reference word input line 62 controlling the input to the reference register 50. Output lines 64, 66, 68 and 70 carry the current data in the storage elements 52, 54, 56 and 58, respectively. It should be appreciated that the reference word is prestored in the reference register 50 and used for comparison with the signal bit stream. However, the contents of the reference register 50 can be modified by means of the reference input 62 and reference clock input 60.

The output lines 34-40 and 64-70 of the respective signal 20 and reference 50 registers are pairwise connected to equivalence gates 72, 74, 76 and 78, respectively, each of which are exclusive-OR gates with a negated output. An equivalence gate produces a positive output only when its two inputs are the same, whether they both are 0 or 1. The pairwise connection is between storage elements of the same order in the two registers 20 and 50.

The outputs of the equivalence gates 72, 74, 76 and 78 are connected to the inputs of a summation or adder circuit 80. The adder circuit 80 adds all the outputs of the equivalence gates 72-78 and produces the sum on its output line 82. This sum represents the number of agreements "A" between the serial data bit stream and the reference word. The maximum value of "A" is thus "N". Any lesser finite value represents partial correlation between the data stream and the reference word. In applications such as spread spectrum communications, a more desirable measure of correlation is the difference, A-D, between bit agreements "A" and disagreements "D". For a sequence of N bits, this conversion is simply made by the algebraic relation $A-D=2A-N$. The output of a correlator can be either digital, in which case a multiple-line bus can carry a digital value, or it can be analog, in which case the voltage on the output line represents the number of bit agreements.

Digital correlators currently available from manufacturers have desirable properties with respect to reliability, maintainability, cost and the application of high scale integrated circuit techniques. They are capable of correlating very long reference sequences without degradation in signal levels. However one of the factors limiting their application has been their low speed or bandwidth capability relative to other technologies such as surface acoustic wave devices. For example, one of the fastest digital correlators presently available is the TDC 1023J produced by TRW LSI Products. This correlator operates on 64-bit data sequences and produces a seven-bit digital output while operating at a clock rate of up to 20 MHz. Many applications require correlation speeds greater than that presently available in digital correlators.

SUMMARY OF THE INVENTION

Accordingly, one object of the present Invention is to provide a digital correlator with increased operating speed.

Another object of this Invention is to provide a digital correlator which makes use of presently available integrated circuits.

Briefly, these and other objects are realized by a multiplexed digital correlator according to the present Invention which comprises a plurality of digital correlators, each of which contains a partition of a reference word. The serial data stream to be correlated against the reference word is multiplexed bit-by-bit into different digital correlators. The outputs of the digital correlators are combined to produce an overall correlation output. In preferred embodiments, a synchronized multiplexed digital correlator is formed from a plurality of multiplexed digital correlators, each having a different phase relationship between the multiplexed serial data bit stream and the reference word.

BRIEF DESCRIPTION OF THE DRAWINGS

A more complete appreciation of the present Invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

One method of increasing the speed of processing of serial data is to multiplex the input data to multiple processors whose operations overlap in time. The outputs of the multiple processors are then appropriately combined in order to produce the correct overall output. If k digital correlators are multiplexed, for a data sequence that is N bits long, each of the k correlators will operate on N/k bits and thus need only operate at 1/k-th of the data stream clock rate.

Figure 2:
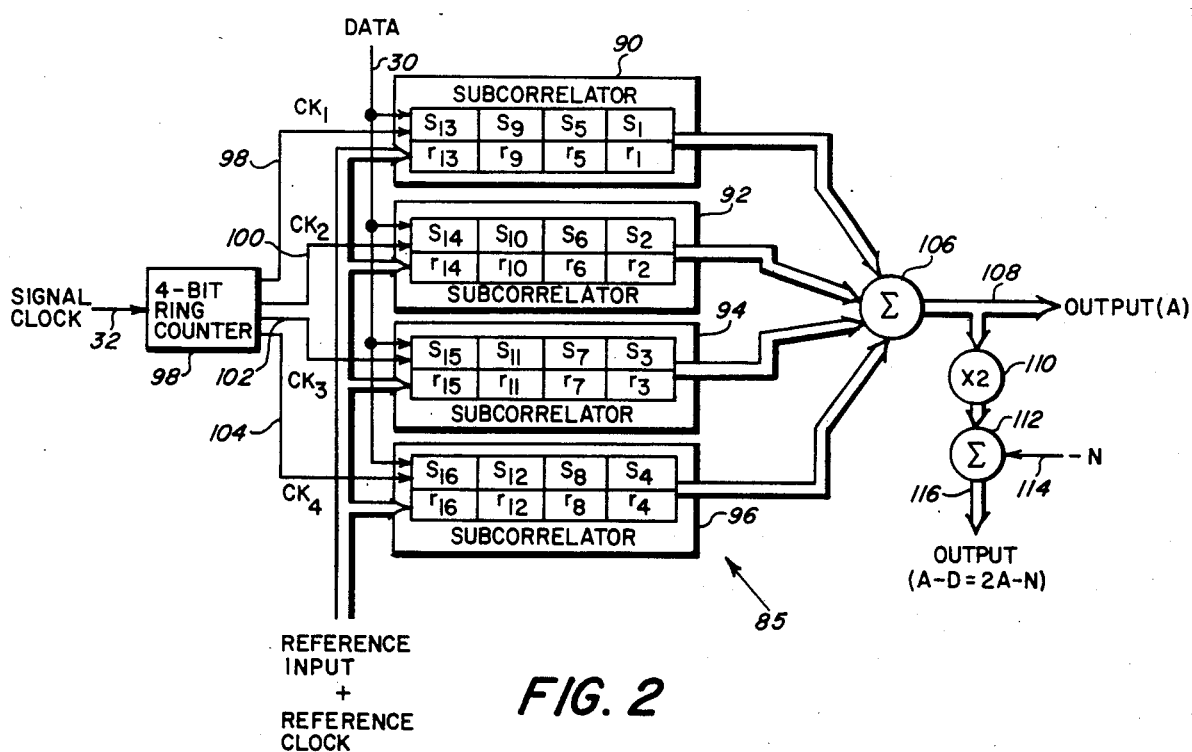
FIG. 2 is a schematic representation of a serially loaded unsynchronized multiplexed digital correlator according to a preferred embodiment of the present Invention.

Referring now to the drawings, wherein like reference numerals designate identical or corresponding parts throughout the several views, and more particularly to FIG. 2 thereof, a serially loaded multiplexed digital correlator 85 according to a first preferred embodiment of the present Invention is schematically illustrated. For illustrative purposes, in the digital correlator 85 of FIG. 2, the sequence length N is chosen to be 16 and the multiplexing factor k is chosen to be 4. With k generally chosen for convenience to be a power of two, N will also be some power n of two. Other sequence lengths may be used and other multiplexing factors can be chosen as should be apparent to those of skill in the art.

Figure 1:
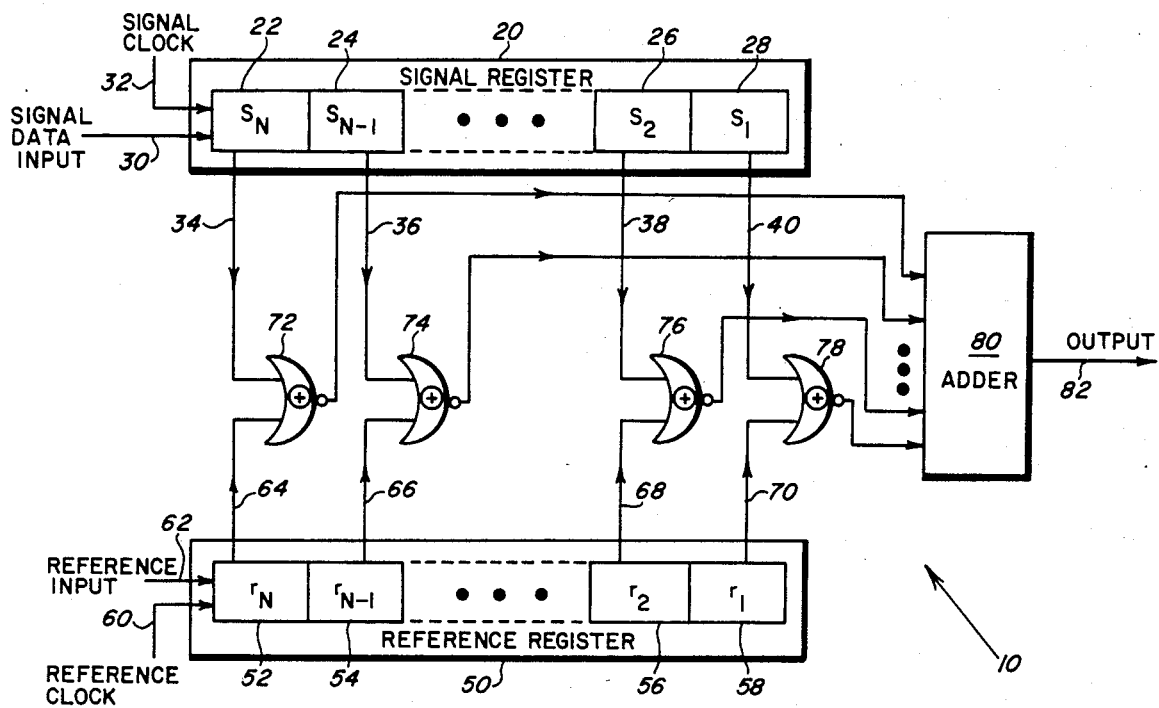
FIG. 1 is a schematic representation of a prior art digital correlator.

The multiplexed digital correlator 85 includes four subcorrelator circuits 90, 92, 94, and 96 which are each logically identical to the digital correlator 10 shown in FIG. 1. However, the four subcorrelators are each of length N/k or 4 bits and are connected in a multiplexed arrangement such that each subcorrelator receives every fourth data bit of the input data stream and operates at one fourth the data rate of the multiplexed correlator 85. Thus each subcorrelator in the multiplexed correlator 85 will be of smaller size and will operate at a lower speed than that of a single prior art correlator designed to operate on the same digital data.

Data Multiplexing is effected by means of a 4-bit ring counter 98. The signal clock line 32 is connected to the input of the 4-bit ring counter 98 which has four outputs connected to four subclock lines 98, 100, 102, and 104. The 4-bit ring counter 98 produces a timing pulse ($CK_1$, $CK_2$, $CK_3$, $CK_4$), on each of its four outputs only once for each four input clock pulses. A timing pulse is produced on one of the four outputs for every input clock pulse. The effect is to commutate or rotate the clock pulses to each of the subclock lines 98–104, which are connected to the enabling signal clock inputs of the respective subcorrelators 90–96. The subclock rate is thus only one-fourth of the clock rate. As a result of this clocking arrangement, each subcorrelator is enabled once every fourth data bit. Thus each subcorrelator only operates at one fourth the data rate of the digital correlator.

In a similar manner, a reference word ($r_{16}$... $r_1$) is previously shifted into the subcorrelators 90–96 so that only every fourth reference bit appears in each subcorrelator. The reference word is written into the subcorrelators in the same order of rotation as that of the rotating clock pulses such that data bit $S_n$ will be compared with the corresponding reference bit $r_n$ as shown in FIG. 2.

The outputs of each of the subcorrelators 90–96, which contain the number of matched bits for that correlator, are connected to a summation circuit 106. The output of the summation circuit 106 represents the number of matched bits in all of the subcorrelators 90–96. If it is desired to monitor an autocorrelation function defined as A-D rather than A, the output 108 of the summation circuit 106 is connected to a times-two multiplier 110, the output of which is connected to an input of a second summation circuit 112. A second input 114 to the summation circuit 112 is maintained at a constant value of $-N$. The output 116 of the summation circuit 112 thus contains the value 2A-N which is equal to A-D. the desired autocorrelation function.

Figure 3:
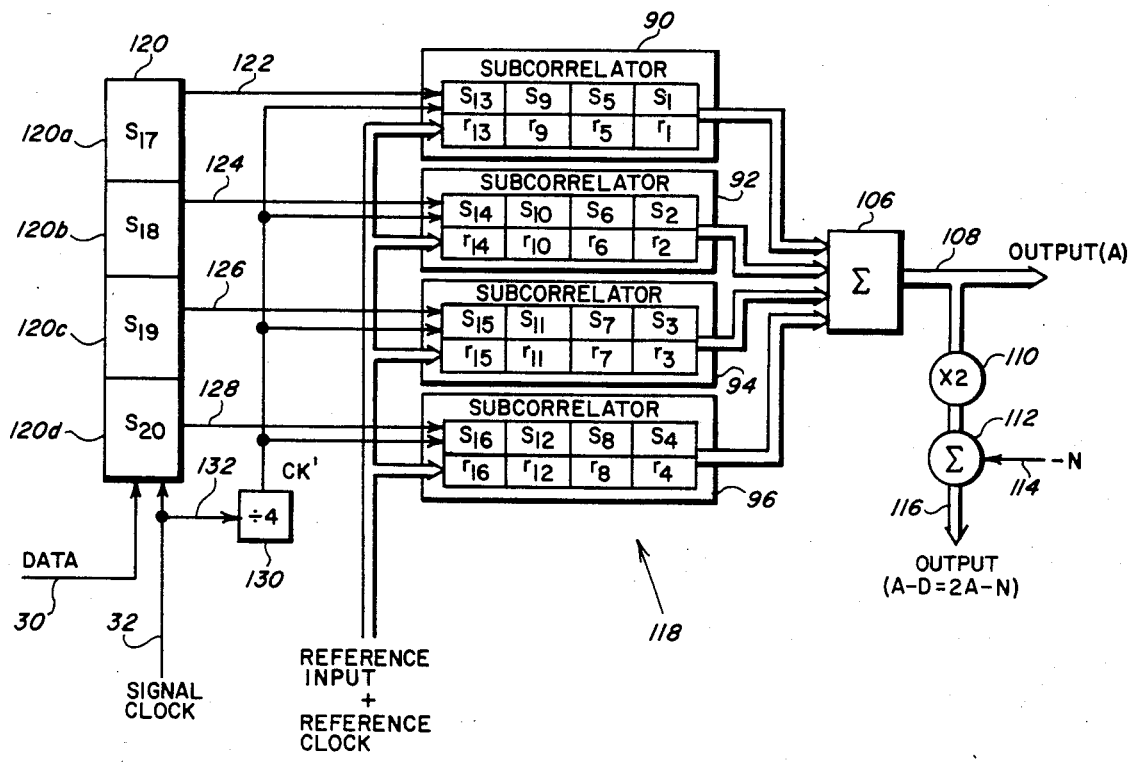
FIG. 3 is a schematic representation of a parallel loaded unsynchronized multiplexed digital correlator according to a preferred embodiment of the present Invention.

FIG. 3 schematically illustrates a parallel loaded multiplexed digital correlator 118 according to a second preferred embodiment of the present Invention. In the embodiment of FIG. 3 the subcorrelators 90, 92, 94, and 96 are the same as those in the serially loaded correlator 85 shown in FIG. 2 and they are likewise loaded with the reference word ($r_{16}$... $r_1$) as described above. The serial data input signal line 30 is connected to the input port of a 4-bit shift register 120 which comprises bit storage elements 120a through 120d. The signal clock line 32 is connected to the clock input of the shift register 120. At each clock cycle, data in the input serial data stream are shifted down one storage element in the shift register 120. Each element 120a through 120d in the shift register 120 has an output 122, 124, 126, or 128, respectively, that carries the current value of the data bit stored in the respective element. The outputs 122, 124, 126, and 128 are connected respectively to the data inputs of the subcorrelators 90–96. The shift register 120 thus operates as a serial to parallel data converter.

The signal clock line 32 is also connected to a divide-by-four counter timing circuit 130 which produces one subclock pulse CK' for every four input clock pulses. The output 132 of the timing circuit 130 is connected to the enable inputs of each of the subcorrelators 90–96.

Four clock cycles are required for new serial input data to fill the shift register 120. At the end of the four clock cycles, the subclock signal CK' causes all four bits of data to be transferred in parallel from the shift register 120 via outputs 122-128 to the first signal bit storage elements of the respective subcorrelators 90, 92, 94, or 96. The phasing of the divide-by-four counter timing circuit 130 must be such that the signal data is written into the appropriate subcorrelator 90, 92, 94, and 96 that contains the corresponding bit of the reference word. Thus in order to detect an autocorrelation of sequence length N or 16, synchronization of the input data stream with the subcorrelator clocks must be assured. This lack of inherent synchronization also applies to the serially loaded correlator 85 of FIG. 2. The summation circuit 106, multiply-by-two circuit 110, and summation circuit 112 are the same as in the serially loaded correlator 85 of FIG. 2 with the A-D autocorrelation appearing on line 116.

One advantage of the parallel loaded correlator 118 over the serially loaded correlator 85 is that on only every fourth clock cycle do any of the subcorrelators 90-96 change outputs, while in the serially loaded correlator 85, one of the subcorrelators 90-96 potentially changes every clock cycle. The correlation output for a good autocorrelation code significantly increases at the moment of registration. For the serially loaded correlator 85, this change occurs gradually over four clock cycles, while the same change occurs in one clock cycle of the parallel loaded correlator 118. This sudden change signifying registration is particularly desirable when threshold circuits are used to detect registration because threshold circuits function more effectively with sharp transitions.

It is to be appreciated that although the above-described embodiments have used four subcorrelators each operating on four bit sequences, the present Invention can be applied to any number of subcorrelators of any bit-length.

A serious limitation of the above-described embodiments is a lack of inherent synchronization. The proper phasing of the 4-bit ring counter 98 and of the divide-by-four timing circuit 130 relative to the input data stream implies synchronization, i.e. the N-bit signal code sequence always being properly positioned in the correct storage register to correlate with the corresponding bit in the N-bit reference register. This requires an exact relationship between the input data stream and the phasing of the subcorrelator timing clocks. This exact relationship will not in general occur. This synchronization problem can be resolved by using a correlator system made up of a number of individual multiplexed correlators. It can be shown that a multiplexed correlator formed from k subcorrelators can be out of synchronization by no more than k-1 clock pulses. Being out of synchronization by k clock pulses corresponds in effect to being in synchronization. Therefore, synchronization is determined modulo k and thus only k synchronization possibilities exist. Thus, a synchronized correlator system can be formed from k separate multiplexed correlators, with each such correlator containing the serial data or the reference word shifted by one bit space relative to the immediately adjacent correlators. The output of one of the individual multiplexed correlators will thus always be in proper synchronization with the input signal bit sequence at any particular time. Specific embodiments of such synchronized correlators will be described in detail below.

Figure 4:
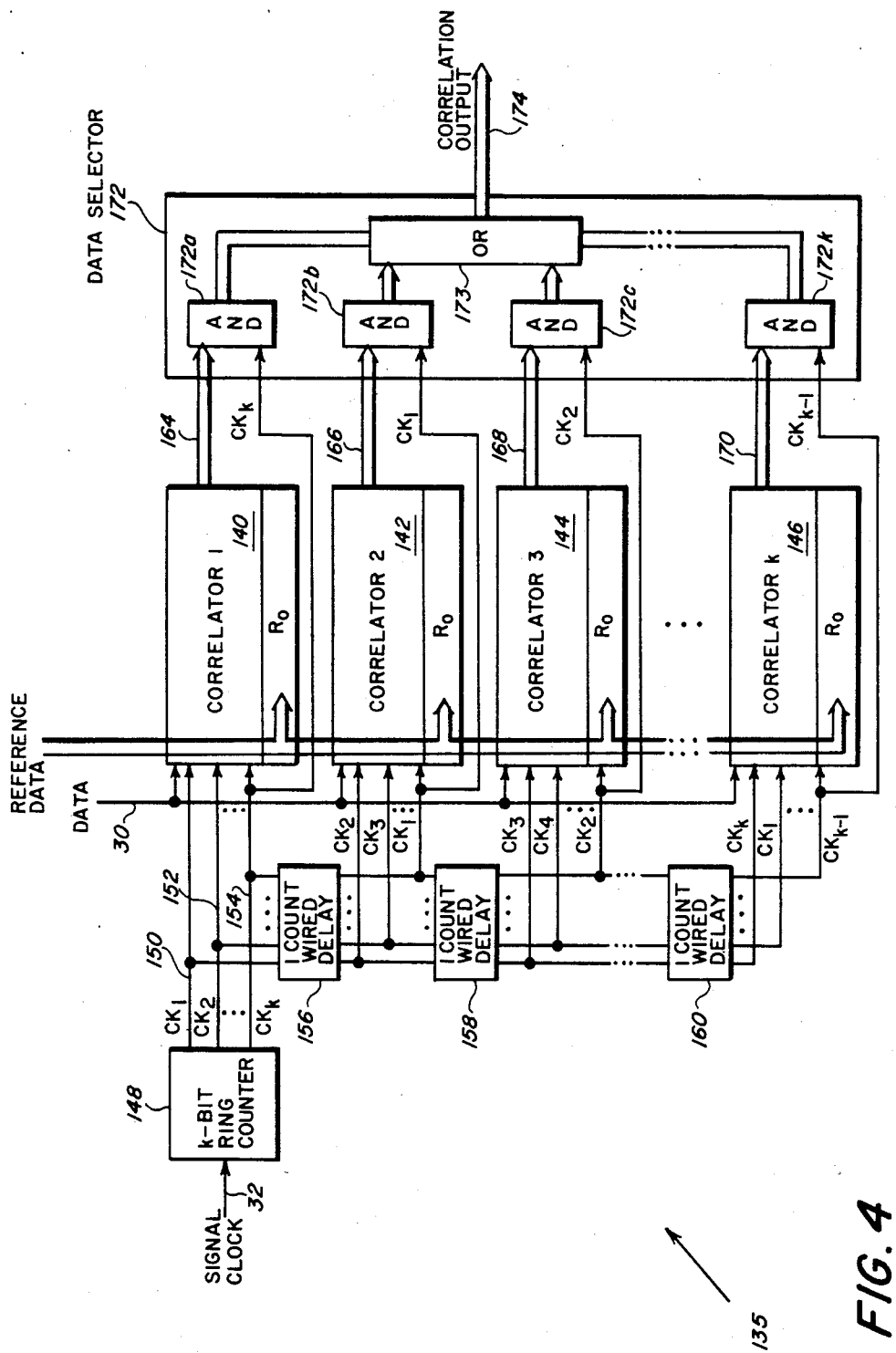
FIG. 4 is a schematic representation of a serially loaded synchronized multiplexed digital correlator according to a preferred embodiment of the present Invention.

FIG. 4 schematically illustrates a synchronized serially loaded multiplexed correlator 135 according to a third preferred embodiment of the present Invention. The synchronized correlator 135 includes k multiplexed correlators 140, 142, 144, and 146 of the general type shown in FIG. 2. Each of the k correlators 140 through 146 comprises k subcorrelators, e.g. the four subcorrelators 90, 92, 94, and 96 of FIG. 2 when k=4. The reference word $R_o=(r_K, \ldots r_1)$ is similarly previously loaded into the reference registers of the subcorrelators of each correlator 140-146. The input signal data line 30 is connected to a data input of each of the correlators, 140-146, and therein are connected to all of the subcorrelators as shown in FIG. 2.

The signal clock line 32 is connected to the input of a k-bit ring counter 148 which operates similarly to the 4-bit ring counter 98 except that it has k outputs, each of which is pulsed once every kth clock cycle. However, in the synchronized correlator 135 no phasing relationship is assumed between the k bit ring counter 148 and the input signal data stream. The outputs $CK_1$, $CK_2$, and $CK_k$ of the ring counter 148 are connected to k subclock lines 150, 152, and 154 as shown in FIG. 4. The subclock lines 150, 152, and 154 are connected to the clock inputs of the subcorrelators in the first correlator 140 similarly to the connections shown in FIG. 2.

The subclock lines 150, 152, and 154 are also connected to the inputs of a one-count wired delay 156 which effectively delays each subclock pulse by one clock period. Alternatively, in place of actual delay circuitry for the one-count wired delay 156, a wired circular shifter can be used which transfers the $CK_1$ input onto the output corresponding to the $CK_k$ input. Similarly the $CK_2$ input is shifted to the $CK_1$ output. These delayed or shifted clock pulses are then fed into the enabling inputs of the subcorrelators of the second correlator 142.

Although the electrical connections between the subclock lines and the second correlator 142 are the same as for the first correlator 140, the effect of the one-count wired delay 156 is to change the phasing by one clock pulse interval or to apply a different subclock pulse to corresponding subcorrelators in different correlators. As a result of the delay or shift in the clock pulses fed to the second correlator 142, the input data written therein will be shifted by one register element or bit place relative to the data written into the first correlator 140. Similar subclock line connections are made to the remaining correlators 144 and 146, with one-count wired delays 158 and 160 interposed between each respective correlator. Thus the data written into correlator 144 is shifted by two register elements relative to the data in correlator 140 and, similarly, the data in correlator 146 is shifted by k−1 or 3 elements relative to correlator 140. As a result of the clocking arrangement, all synchronization possibilities are available for comparison with the reference word $R_o$.

Each of the correlators 140, 142, 144, and 146 have correlation outputs 164, 166, 168 and 170, respectively, which carry some measure of the number of matches within that correlator, whether it be A, A-D or some other function. The synchronization of only one of the correlators 140-146 is the correct one so that only one of the correlator outputs 164-170 will properly record the possible occurance of a perfect match between the input signal data stream and the reference word $R_o$. Furthermore, any of the correlators 140-146 can perform a proper correlation only when the last bit written in is matched with the lowest order bit in the reference register. In other words. a proper correlation can only occur when the most recent data bit is written into the kth subcorrelator of any correlator 140-146. Thus an equivalent correlator output can be formed by connecting the correlator outputs 164-170 to a data selector 172 which selectively switches only one of its inputs to its output port 160. The data selector is coupled to receive the subclock pulses $CK_k$, $CK_1$, $CK_2$, ... $CK_{k-1}$, as illustrated. The input to the data selector 172 is selected which has been enabled by the clock signal applied to the kth subcorrelator of the correlator producing that correlator's output. For example the first correlator output 164 is enabled by the $CK_K$ subclock pulse, the second correlator output 166 by the $CK_1$ subclock pulse, the third correlator output 168 by the $CK_2$ subclock pulse, and the kth correlator output 170 is enabled by the $CK_{k-1}$ subclock pulse. The data selector 172 may be implemented by means of a plurality of AND gates 172a through 172k and an OR gate 173 in a manner well known in the art.

The synchronized correlator 135 of FIG. 4 rotates the subclock pulses $CK_1$-$CK_k$ thus in effect enabling the correlators 140, 142, 144, and 146 to rotate the input data signal registers of the subcorrelators that are correlated with the reference register partitions of the reference word $R_o$ in each of the correlators. An alternative but equivalent embodiment (not illustrated) rotates the reference word registers of the subcorrelators, rather than rotating the data, i.e., each correlator 144-146 has a modified reference word composed of the same elements but with the elements paired to different subcorrelators in the different correlators. Referring again to FIG. 2, the arrangement of the reference bits indicated therein is the one used with the first correlator 140 of FIG. 4. However, for the second correlator 142 of FIG. 4, the reference bits are written in so that the reference bits indicated for the fourth subcorrelator 96 of FIG. 2 are instead written into the first subcorrelator 140 of FIG. 4 and the reference bits indicated for the first subcorrelator 90 of FIG. 2 are instead written into the second correlator 132 of FIG. 4 and so on. Further rotation of the reference word is used for subsequent correlators 144 and 146 shown in FIG. 4. The arrangement of the subclocks in the alternative embodiment is identical in all correlators and is that of the first correlator 140 of FIG. 4. Also, the enabling of the data selector 172 uses the same subclock lines indicated in FIG. 4.

Figure 5:
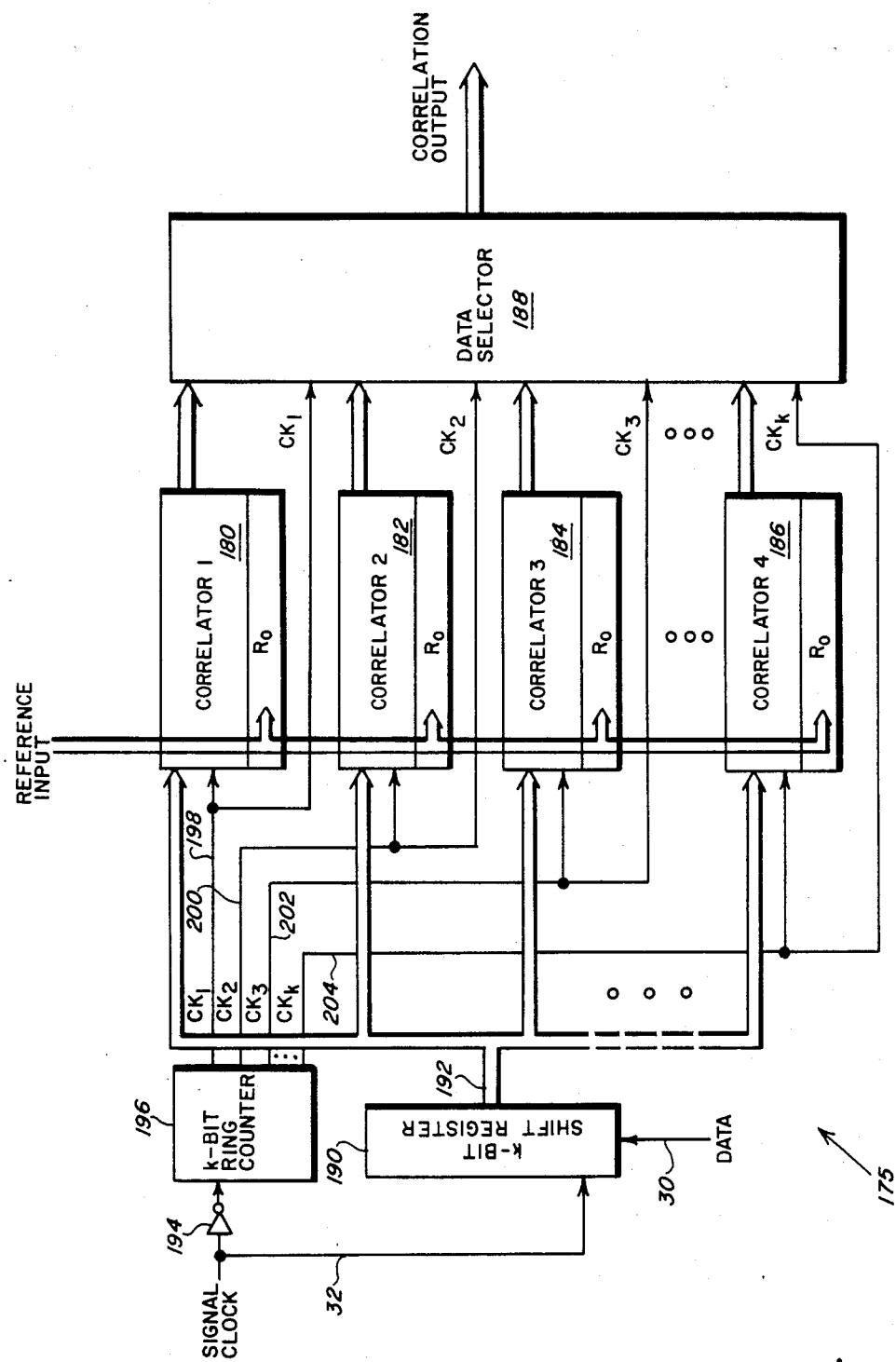
FIG. 5 is a schematic representation of a parallel loaded synchronized multiplexed digital correlator according to a preferred embodiment of the present Invention.

FIG. 5 schematically illustrates a synchronized parallel loaded multiplexed correlator 175 according to a fourth preferred embodiment of the present Invention. The synchronized correlator 175 includes k correlators 180, 182, 184, and 186 and a data selector 188 coupled to receive the outputs of the k correlators. The k correlators 180-186 and the data selector 188 are essentially similar to those described above with respect to FIG. 4.

The serial input data on line 30 is coupled to a k-bit shift register 190 which is clocked by the signal clock appearing on line 32. Each bit storage element of the k-bit shift register 190 is connected to one line of a k-line bus 192. The shift register 190 acts to convert the serial input data into parallel form with the parallel output supplied on the k lines of the bus 192.

The k lines of the bus 192 are coupled to each of the k correlators 180-186. However, the inputs of corresponding subcorrelators in each of the correlators 180-186 are connected to different lines of the bus 192 such that the parallel data loaded into each correlator is shifted by one bit interval relative to the adjacent correlators. The reference word $R_o$ ($r_1$ ... $r_k$) is, however, loaded into each correlator in a uniform arrangement similar to that described above with respect to FIG. 4. Thus, due to the shift in the input data, all k synchronization possibilities exist among the correlators of the synchronous correlator 175.

The timing of the correlators 180-186 and the data selector 188 is accomplished by inverting the signal clock pulse on line 32 in an inverter 194 before it is fed into the input of the k-bit ring counter 196. There are k subclock lines 198, 200, 202, and 204 connected to the outputs ($CK_1$, $Ck_2$, $CK_3$, ... $CK_k$) of the k-bit ring counter 196. Each subclock line 198, 200, 202, or 204 is connected to an enable input of the data selector 188 that switches in the correlation output of the correlator associated with that subclock line. Thus, the output of correlator 180 is coupled to the output 206 of the data selector 188 when the subclock pulse $CK_1$ occurs, the output of correlator 182 is coupled to the output 206 when the subclock pulse $CK_2$ appears, and so on. Inverting the clock pulse before application to the ring counter 196 causes the subclock pulses to be generated on the trailing edges of the signal clock pulse. This allows one signal clock pulse width interval for the latest signal bit to be accepted by the k-bit shift register 190 before the input signal data bits are written into the correlator enabled by the generated subclock pulse.

Because the embodiment shown in FIG. 5 only performs correlations for data bits arranged against the reference word in the same order that they arrive in the data stream, the resultant correlations are the same as an non-multiplexed correlator would perform. The correlation peaks produced by any correlator 180-186 are no different than those of a non-multiplexed correlator. Likewise cross-correlation outputs, although displaced in time, will not be any larger. As a result the output of each correlator 180-186 can be directly fed into a separate threshold circuit (not illustrated). The threshold setting for the separate threshold circuits is the same and is equivalent to that of a non-multiplexed correlator as determined by the probability of detection and false alarm requirements. The outputs of all the threshold circuits can then be combined in an OR-gate, the output of which can indicate a correlation peak.

It can be seen from the various embodiments of the synchronized multiplexed correlators according to the present Invention that the signal or data bits stored in the registers of the subcorrelators are the same from correlator to correlator. The order in which they are stored however differs. Therefore, it is necessary to store only N bits of reference word and N bits of serial data in the synchronized multiplexed correlators. However k sets of N-bit comparator circuitry are required to perform the same comparisons required for the embodiments of FIGS. 4 and 5. The interconnections between the N-bit reference and signal registers and the k N-bit comparators should be apparent to one skilled in the art using the concepts and circuitry of FIGS. 1, 2, and 4 or FIGS. 1, 3, and 5.

Additional information regarding the present Invention can be found in L. M. Leibowitz, "Digital Correlator Speed Improvement By Multiplexing", NRL Report 8750, Sept. 30, 1983, Naval Research Laboratory, Washington, D.C. The contents of this article are hereby incorporated herein by reference.

Obviously, numerous modifications and variations of the present invention are possible in light of the above teachings. It is therefore to be understood that within the scope of the appended claims, the present Invention may be practiced otherwise than as specifically described herein.

What is claimed as new and desired to be secured by Letters Patent of the United States is:

1. A high speed digital correlator system for correlating input data bits in a serial input data stream comprising:
   k digital correlators coupled to operate in parallel and to receive data bits from said serial input data stream;
   multiplexing means coupled to said k correlators for directing each input data bit in said input data stream into one of said k correlators, each of said k correlators receiving every kth bit in said data stream said multiplexing means includes a k-bit ring counter with a clock input and k outputs, each of said k outputs being coupled to supply an input enabling signal to a respective one of said k correlators, said clock input being adapted to receive a clock signal synchronized with the flow of data bits in said serial input data stream, said ring counter supplying an input enabling signal to one of said k outputs in synchronism with each data bit in said serial input data stream coupled to each of said k correlators for enabling the input of each data bit from said serial input data stream to one of said k correlators, each of said k correlators being enabled to receive every kth data bit from said serial input data stream; and
   combining means coupled to receive the outputs of said k correlators for combining said outputs into a measure of overall correlation;
   wherein each of said k correlators operates at 1/kth of the data rate of said input data stream.

2. A high speed digital correlator system for correlating input data bits in a serial input data stream comprising:
   k digital correlators coupled to operate in parallel;
   serial to parallel data converter means coupled to receive data bits from said serial input data stream for supplying said data bits to k parallel outputs, each of said k parallel outputs being coupled to a data input of a respective one of said k correlators;
   timing circuit means coupled to receive a clock signal synchronized with the flow of data in said serial input data stream for dividing the frequency of said clock signal by k and for supplying the frequency divided clock signal to an enabling input each of said k correlators; and
   combining means coupled to receive the outputs of said k correlators for combining said outputs into a measure of overall correlation;
   wherein each of said k correlators operates at 1/6th of the data rate of said input data stream.

3. A high speed synchronized multiplexed digital correlator system for correlating data bits in a serial data stream against a reference word, comprising:
   k digital correlators coupled to operate in parallel, each of said k correlators being coupled to receive data bits from said serial data stream, each correlator being coupled to receive a data enabling signal from said multiplexing means for enabling the input of data bits from said serial data stream into said correlator, each of said k correlators being adaptable to contain a portion of said reference word;
   a k-bit ring counter including a clock input and k outputs, said clock input being adatable to receive a clock signal synchronized with the flow of data bits in said serial data stream, each of said k outputs being coupled to supply said data enabling signals to said k multiplexed correlators, said ring counter supplying a data enabling signal to one of said k outputs in synchronism with each data bit in said serial data stream;
   delay means coupled to receive said ouputs of said ring counter and coupled to supply said data enabling signals to said k multiplexed correlators, said delay means delaying the data enabling signals supplied to each multiplexed correlator relative to the adjacent multiplexed correlators by one pulse interval of said clock signal;
   first combining means coupled to receive the outputs of said k digital correlators for combining said outputs into a measure of overall correlation; and
   second combining means coupled to receive the outputs of each of said k correlators for combining said correlator outputs to form an output for said multiplexed correlator.

4. A high speed synchronized multiplexed digital correlator system for correlating data bits in a serial stream against a reference word, comprising:
   k digital correlators coupled to operatate in parallel, each correlator including a data input port coupled to receive data bits from said multiplexing means and including a data enabling input port coupled to receive data enabling signal from said multiplexing means, said data enabling signals gating data bits appearing at said data input ports into said correlators, each correlator being adaptable to receive a portion of said reference word;
   serial to parallel data converter means coupled to receive data bits from said serial data stream for supplying said data bits in parallel form to parallel outputs, each of said k parallel outputs being coupled to a data input port of a respective correlator in each multiplexed correlator, said k parallel outputs being coupled to the correlators in each of said k multiplexed correlators in a different order such that all of said k possible synchronization possibilities with said reference word occur in said k multiplexed correlators;
   a k-bit ring counter including a clock input and k outputs, said clock input being adaptable to receive a clock signal synchronized with the flow of data bits in said serial data stream, said ring counter supplying a data enabling signal to one of said k ring counter outputs in synchronism with each data bit in said serial data stream, each multiplexed correlator being coupled to receive data enabling signals from one of said k ring counter outputs, said data enabling signald supplied to each multiplexed correlator being supplied to the data enabling input ports of each correlator therein;
   first combining means coupled to receive the outputs of said k digital correlators for combining said outputs into a measure of overall correlation;
   second combining means coupled to receive the outputs of each of said k correlators for combining said correlator outputs to form an output for the multiplexed correlator; and
   summation means for adding the outputs of said k correlators.

* * * * *